(12) United States Patent
Sakai (10) Patent No.: US 10,246,596 B2
(45) Date of Patent: *Apr. 2, 2019

(54) WATER-BASED WHITE PIGMENT INK FOR INK-JET RECORDING

(71) Applicant: BROTHER KOGYO KABUSHIKI KAISHA, Nagoya-shi, Aichi (JP)

(72) Inventor: Jun Sakai, Nagoya (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,216

(22) Filed: Mar. 28, 2017

(65) Prior Publication Data

US 2017/0283638 A1    Oct. 5, 2017

(30) Foreign Application Priority Data

Mar. 31, 2016 (JP) ................. 2016-072338

(51) Int. Cl.
| | |
|---|---|
| *C09D 11/322* | (2014.01) |
| *C09D 11/033* | (2014.01) |
| *C09D 11/102* | (2014.01) |
| *C09D 11/107* | (2014.01) |
| *C09D 11/106* | (2014.01) |

(52) U.S. Cl.
CPC .......... *C09D 11/322* (2013.01); *C09D 11/033* (2013.01); *C09D 11/102* (2013.01); *C09D 11/106* (2013.01); *C09D 11/107* (2013.01)

(58) Field of Classification Search
CPC ... C09D 11/033; C09D 11/102; C09D 11/107; C09D 11/322
See application file for complete search history.

(56) References Cited

U.S. PATENT DOCUMENTS

| | | |
|---|---|---|
| 7,538,148 B2 | 5/2009 | Inoue et al. |
| 2007/0191509 A1 | 8/2007 | Kobayashi |
| 2012/0251795 A1 | 10/2012 | Okada et al. |
| 2014/0210900 A1 | 7/2014 | Ohashi et al. |
| 2015/0259550 A1 | 9/2015 | Sakai et al. |
| 2015/0375528 A1 | 12/2015 | Kitagawa et al. |

FOREIGN PATENT DOCUMENTS

| | | |
|---|---|---|
| JP | 2004-291461 A | 10/2004 |
| JP | 2007-211176 A | 8/2007 |
| JP | 2009-209493 A | 9/2009 |
| JP | 2014-148563 A | 8/2014 |
| JP | 2015-174960 A | 10/2015 |

OTHER PUBLICATIONS

United States Patent and Trademark Office, Non-Final Office Action issues in U.S. Appl. No. 15/471,182 (related to above-captioned patent application), dated Nov. 20, 2017.
Office Action for the related U.S. Appl. No. 15/471,182 dated Sep. 5, 2018.

*Primary Examiner* — Edward J Cain
(74) *Attorney, Agent, or Firm* — K&L Gates LLP (57) ABSTRACT

A water-based white pigment ink for ink-jet recording includes a white pigment and water. The ink further includes a first resin emulsion having a tensile elongation from 600% to 1200% as a film, measured in accordance with JIS K 7127 and a second resin emulsion having a maximum tensile stress from 50 MPa to 80 MPa as a film, measured in accordance with JIS K 7127. The solid content (R1) of the first resin emulsion to be added and the solid content (R2) of the second resin emulsion to be added in the total amount of the ink satisfy R1/R2=0.4 to 2.5.

11 Claims, 4 Drawing Sheets

WATER-BASED WHITE PIGMENT INK FOR INK-JET RECORDING

CROSS-REFERENCE TO RELATED APPLICATION

This application claims priority from Japanese Patent Application No. 2016-072338 filed on Mar. 31, 2016. The entire subject matter of the Japanese Patent Application is incorporated herein by reference.

BACKGROUND

A water-based white pigment ink containing a white pigment and water has conventionally been used in ink-jet recording. For example, a water-based white pigment ink for ink-jet recording, containing a white pigment and a resin that causes the white pigment to bind to the surface of fabric has been proposed.

SUMMARY

A water-based white pigment ink for ink-jet recording includes: a white pigment and water, wherein the water-based white pigment ink further includes: a first resin emulsion having a tensile elongation from 600% to 1200% as a film, measured in accordance with JIS K 7127; and a second resin emulsion having a maximum tensile stress from 50 MPa to 80 MPa as a film, measured in accordance with JIS K 7127, and a solid content (R1) of the first resin emulsion to be added and a solid content (R2) of the second resin emulsion to be added in the total amount of the ink satisfy R1/R2=0.4 to 2.5.

DETAILED DESCRIPTION

The water-based white pigment ink for ink-jet recording (hereinafter also merely referred to as an "ink") contains a white pigment, water, a first resin emulsion, and a second resin emulsion.

The white pigment can be, for example, a white pigment containing a hollow particle or a non-hollow particle (a particle which is not hollow. It is also called a solid particle). In a conventionally known method, the amount of a white pigment containing a hollow particle to be added in an ink is required to be higher, for example, to obtain whiteness and concealing properties equivalent to the case of using a white pigment containing a non-hollow particle. Furthermore, when a binding component such as the resin is heated to form a film containing the hollow particle, cracks of the film are prone to be generated. However, according to the present invention, cracks of the film can be reduced not only in the case of using a white pigment containing the non-hollow particle but also in the case of using a white pigment containing the hollow particle, for example. The hollow particle and the non-hollow particle may be used in combination as the white pigment in the ink.

The hollow particle may be self-prepared by the method described in JP 2007-211176 A and JP 2015-174960 A, or a commercially available product may be used. Examples of the commercially available product include "SX-866(B)" (styrene-acrylic dispersion liquid, solid content: 20 wt %, primary particle size: 0.3 µm) and "SX-868(B)" (styrene-acrylic dispersion liquid, solid content: 20 wt %, primary particle size: 0.5 µm) produced by JSR CORPORATION; "ROPAQUE® ULTRA E" (styrene-acrylic dispersion liquid, solid content: 30 wt %, primary particle size: 0.4 µm) produced by Rohm and Haas Electronic Materials K.K.; and "NIPOL® V1004" (modified styrene-butadiene dispersion liquid, solid content: 50 wt %, primary particle size: 0.3 µm), "NIPOL® MH8055" (styrene-acrylic dispersion liquid, solid content: 30 wt %, primary particle size: 0.8 µm), and "NIPOL® MH5055" (styrene-acrylic dispersion liquid, solid content: 30 wt %, primary particle size: 0.5 µm) produced by ZEON CORPORATION. It is to be noted that the primary particle size indicates a volume average particle size.

Examples of the non-hollow particle include titanium oxide, silicon oxide, zinc oxide, aluminum oxide, magnesium oxide, barium sulfate, and calcium carbonate. A commercially available processed pigment may be used as the non-hollow particle. Examples of the commercially available processed pigment include "NAF 5002 White" (solid content: 70.7 wt %, volume average particle size: 0.4 µm), "AF White E-3D" (solid content: 70 wt %, volume average particle size: 0.4 µm), and "MF-5765 White" (solid content: 67 wt %, volume average particle size: 0.4 µm) produced by Dainichiseika Color & Chemicals Mfg. Co., Ltd. The solid content in the commercially available processed pigment is the total of the solid content of a pigment to be added and the solid content of a pigment dispersing resin to be added.

The solid content (pigment solid content P) of the white pigment to be added in the total amount of the ink is not limited to particular values and is, for example, in the range from 1 wt % to 25 wt %, 3 wt % to 20 wt %, or 5 wt % to 15 wt %.

The water is, for example, distilled water, ion-exchange water, or pure water. The amount of the water to be added in the total amount of the ink may be, for example, a balance of the other components.

The tensile elongation of the first resin emulsion as a film, measured in accordance with JIS K 7127 (1999 version) (hereinafter also merely referred to as the "tensile elongation") is from 600% to 1200%. JIS K 7127 (1999 version) corresponds to ISO 527-3 (2012 version). Examples of the first resin emulsion include an urethane resin emulsion, an acryl resin emulsion, and a styrene resin emulsion. As the first resin emulsion, a commercially available product may be used, for example. Examples of the commercially available product include: "BONTIGHTER® HUX-561S" (tensile elongation: 620%), "BONTIGHTER® HUX-564" (tensile elongation: 700%), "BONTIGHTER® HUX-210" (tensile elongation: 900%), and "BONTIGHTER® HUX-282" (tensile elongation: 1100%) produced by ADEKA CORPORATION; "PERMARIN® UA-150" (tensile elongation: 600%) and "PERMARIN® UA-200" (tensile elongation: 710%) produced by Sanyo Chemical Industries, Ltd.; and "SUPERFLEX® 460" (tensile elongation: 750%) and "SUPERFLEX® E-4800" (tensile elongation: 720%) produced by DKS Co., Ltd. The first resin emulsion preferably has a tensile elongation from 1000% to 1200% for the reason that cracks of an ink film formed on the surface of a recording medium can be reduced, and an ink having a good balance between the tensile elongation and the abrasion resistance can be obtained.

The maximum tensile stress of the first resin emulsion as a film, measured in accordance with JIS K 7127 (1999 version) (hereinafter also merely referred to as the "maximum tensile stress") is preferably from 50 MPa to 80 MPa. Among the commercially available products, the first resin emulsion satisfying this maximum tensile stress can be, for example, "BONTIGHTER® HUX-561S" (maximum tensile stress: 68 MPa) and "BONTIGHTER® HUX-564" (maximum tensile stress: 70 MPa) produced by ADEKA CORPORATION. The first resin emulsion satisfying this maximum tensile stress can also serve as the second resin emulsion described below. That is, the first resin emulsion also has the characteristics of the second resin emulsion, and the amount of the second resin emulsion described below to be added thus can be reduced.

The maximum tensile stress of the second resin emulsion is from 50 MPa to 80 MPa. Examples of the second resin emulsion include an urethane resin emulsion, an acryl resin emulsion, and a styrene resin emulsion. As the second resin emulsion, a commercially available product may be used, for example. Examples of the commercially available product include: "BONTIGHTER® HUX-386" (maximum tensile stress: 68 MPa), "BONTIGHTER® HUX-561S" (maximum tensile stress: 68 MPa), and "BONTIGHTER® HUX-564" (maximum tensile stress: 70 MPa) produced by ADEKA CORPORATION; and "UCOAT® UX-320" (maximum tensile stress: 50 MPa) produced by Sanyo Chemical Industries, Ltd.

The second resin emulsion preferably has a tensile elongation from 600% to 1200%. Among the commercially available products, the second resin emulsion satisfying this tensile elongation can be, for example, "BONTIGHTER® HUX-564" (tensile elongation: 700%) produced by ADEKA CORPORATION. The second resin emulsion satisfying this tensile elongation can also serve as the first resin emulsion. That is, the second resin emulsion can also have the characteristics of the first resin emulsion, and thus the amount of the first resin emulsion to be added, which is prone to reduce abrasion resistance when it is added in a large amount, can be reduced.

The solid content (R1) of the first resin emulsion to be added and the solid content (R2) of the second resin emulsion to be added in the total amount of the ink satisfy R1/R2=0.4 to 2.5. By the use of the ratio in combination, cracks of an ink film formed on the surface of a recording medium can be reduced, and the abrasion resistance can be improved. The solid content (R1) of the first resin emulsion to be added and the solid content (R2) of the second resin emulsion to be added are only required to be appropriately adjusted to satisfy the ratio. R1 and R2 preferably satisfy R1/R2=0.75 to 1.33 for the reason that cracks of an ink film formed on the surface of a recording medium can be reduced, and an ink having a good balance between the tensile elongation and the abrasion resistance can be obtained.

The pigment solid content P and the sum of the solid content R1 and the solid content R2 (R1+R2) satisfy (R1+R2)/P=0.8 to 3 or (R1+R2)/P=1 to 2, for example.

The ink may further contain a humectant. The humectant prevents the ink from drying at the tip of an ink-jet head, for example. The humectant is not limited to particular humectants, and examples thereof include ketoalcohol such as diacetone alcohol; polyalkylene glycol; polyhydric alcohol such as alkylene glycol, glycerin, and trimethylol propane; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, diethylene glycol, triethylene glycol, dipropylene glycol, tripropylene glycol, thiodiglycol, and hexylene glycol. One of the humectants may be used alone, or two or more of them may be used in combination. Among them, the humectant is preferably polyhydric alcohol such as alkylene glycol and glycerin. The amount of the humectant to be added in the total amount of the ink is, for example, from 0 wt % to 60 wt % or from 3 wt % to 50 wt %.

The ink may further contain a surfactant. The surfactant allows the surface tension of the ink to be adjusted and the dispersibility of the white pigment to be improved, for example. The surfactant is not limited to particular surfactants, and examples thereof include anionic surfactants produced by Kao Corporation such as EMAL® series, LATEMUL® series, VENOL® series, NEOPELEX® series, NS SOAP, KS SOAP, OS SOAP, and PELEX® series; anionic surfactants produced by Lion Corporation such as LIPOLAN® series, LIPON® series, SUNNOL® series, LIPOTAC® TE, ENAGICOL series, LIPAL® series, and LOTAT® series; nonionic surfactants produced by Kao Corporation such as EMULGEN® series, RHEODOL® series, EMASOL® series, EXCEL® series, EMANON® series, AMIET® series, and AMINON® series; nonionic surfactants produced by Lion Corporation such as DOBANOX® series, LEOCOL® series, LEOX® series, LAOL, LEOCON® series, LIONOL® series, CADENAX® series, LIONON® series, and LEOFAT® series; and cationic surfactants produced by DKS Co., Ltd. such as CATIOGEN® ES-OW and CATIOGEN® ES-L. One of the surfactants may be used alone, or two or more of them may be used in combination. The amount of the surfactant to be added in the total amount of the ink is, for example, from 0 wt % to 2 wt %, 0.01 wt % to 1.5 wt %, or 0.01 wt % to 1 wt %.

The ink may further contain a conventionally known additive as needed. Examples of the additive include a pH adjuster, a viscosity modifier, a surface tension modifier, and a mildewproofing agent. Examples of the viscosity modifier include polyvinyl alcohol, cellulose, and a water-soluble resin.

The ink may be prepared by uniformly mixing the white pigment, the water, the first resin emulsion, the second resin emulsion, and an additive component(s) as necessary by a conventionally known method and removing an insoluble matter(s) with a filter or the like, for example.

The ink may be for use in ink-jet recording, for example, on fabric. Besides this, the ink may be for use in ink-jet recording, for example, on recording paper, a transparent sheet such as an OHP sheet, and the like.

An ink cartridge contains the water-based white pigment ink for ink-jet recording. As a main body of the ink cartridge, for example, a conventionally known main body may be used.

The ink-jet recording apparatus includes an ink storing portion and an ink ejecting unit. The ink ejecting unit ejects an ink stored in the ink storing portion. The ink storing portion contains the water-based white pigment ink for ink-jet recording.

The ink-jet recording method ejects an ink to a recording medium by an ink-jet method to record. The water-based white pigment ink for ink-jet recording is used as the ink.

The ink-jet recording method may be performed using the ink-jet recording apparatus, for example. Examples of the recording include printing of letters and images.

The method for forming an image is a method for forming an image on fabric. The method includes a step of printing an image on fabric using an ink, and the water-based white pigment ink for ink-jet recording is used as the ink in the image printing step. The method for forming an image may further include, besides the image printing step, the treatment step, the heat treatment step, the compression step, and the heat-fixing step described below, for example.

The method for forming an image may include a treatment step of applying a treatment agent to the fabric. The treatment step is performed before the image printing step, for example. The treatment agent contains a cationic substance that reacts with the white pigment to aggregate. The treatment agent is characterized in that it contains a cationic substance, and other configurations are by no means limited. For example, the treatment agent may contain water or may contain a component other than a cationic substance and water. The cationic substance contained in the treatment agent is not limited to particular cationic substances, and examples thereof include polyvalent metal ions such as a calcium ion, a magnesium ion, an aluminum ion, a barium ion, a copper ion, an iron ion, a manganese ion, a nickel ion, a tin ion, a titanium ion, and a zinc ion; cationic polymers; and cationic surfactants. The polyvalent metal ion may be added to the treatment agent in a form of salt with a chloride ion, a bromide ion, an iodide ion, a sulfate ion, a nitrite ion, a nitrate ion, a dihydrogenphosphate ion, an acetate ion, a thiocyanate ion, an oxalate ion, a lactate ion, a fumarate ion, a citrate ion, a salicylate ion, a benzoate ion, and the like. That is, the polyvalent metal ion may be added to the treatment agent in a form of calcium chloride, calcium bromide, calcium iodide, calcium nitrite, calcium nitrate, calcium dihydrogenphosphate, calcium thiocyanate, calcium lactate, calcium fumarate, calcium citrate, magnesium chloride, magnesium bromide, magnesium iodide, magnesium sulfate, aluminium chloride, aluminium bromide, aluminium sulfate, aluminium nitrate, aluminium acetate, barium chloride, barium bromide, barium iodide, barium nitrate, barium thiocyanate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc thiocyanate, zinc acetate, and the like.

In the treatment step, the treatment agent may be applied, for example, by an ink-jet method, a spraying method, a stamping method, a brushing method, or a method using a roller.

Figure 1A:
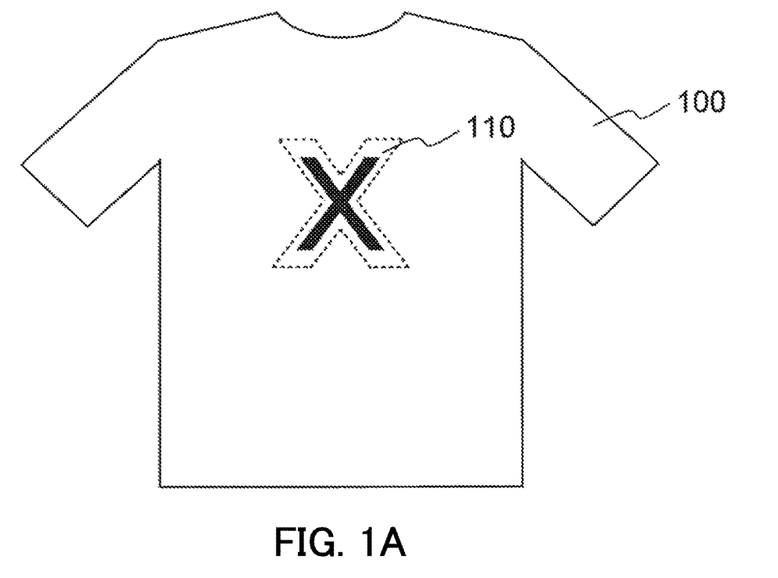
FIGS. 1A and 1B are illustrations showing example applications of a treatment agent in a method for forming an image.
Figure 1B:
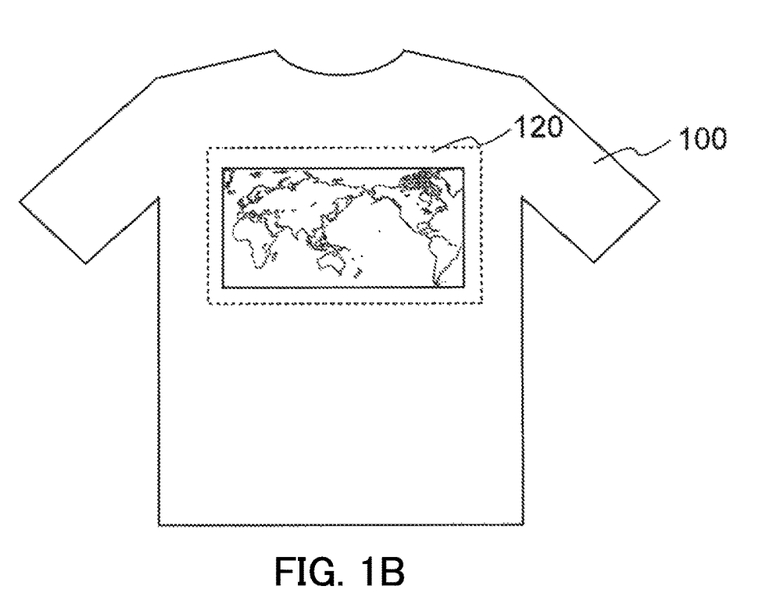

In the treatment step, the treatment agent is applied to at least an area having substantially the same size as an area to be printed with an ink, and is preferably applied to an area larger than the area to be printed. For example, as shown in FIG. 1A, when the letter "X" is printed on the fabric (T-shirt in this example) 100, the treatment agent is preferably applied to form a treatment agent-applied area 110 having a line width wider than that of the letter. Furthermore, as shown in FIG. 1B, when an image is printed on the fabric (T-shirt) 100, the treatment agent is preferably applied to form a treatment agent-applied area 120 that is larger than the image.

The method for forming an image may include, after the treatment step, at least one of a heat treatment step of applying heat treatment to the treatment agent-applied area and a compression step of compressing the treatment agent-applied area. The heat treatment may be applied by using a commercially available hot pressing machine, oven, belt conveyor oven, or the like, for example. When the hot pressing machine is used, the heat treatment is preferably applied in the state where a Teflon® sheet having a smooth surface is placed on the treatment agent-applied area. The fuzz of the fabric can thereby be reduced, and this allows the image printing step to be performed more smoothly when the image printing step is performed after the heat treatment step, for example. The temperature of the heat treatment is not limited to a particular temperature, and is, for example, from 160° C. to 185° C. The compression may be performed by using a commercially available hot pressing machine under the same condition as the heat treatment, for example.

The image printing step is a step of printing an image on the fabric using the water-based white pigment ink for ink-jet recording.

Figure 2:
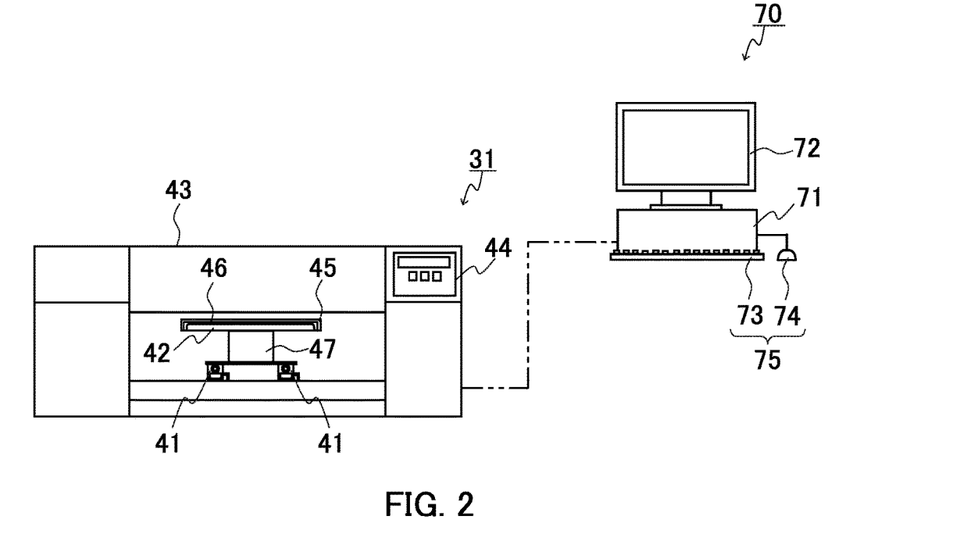
FIG. 2 is a schematic view showing an example configuration of an ink-jet recording apparatus.

The image printing step can be performed using, for example, the ink-jet recording apparatus shown in FIG. 2. As shown in FIG. 2, the ink-jet recording apparatus 30 is configured such that an ink-jet printer 31 configured to record a desired image by ejecting an ink to the fabric and a recording control unit 70 configured to acquire the image data of the desired image and control the ink-jet printer 31 are connected via an interface.

Figure 3:
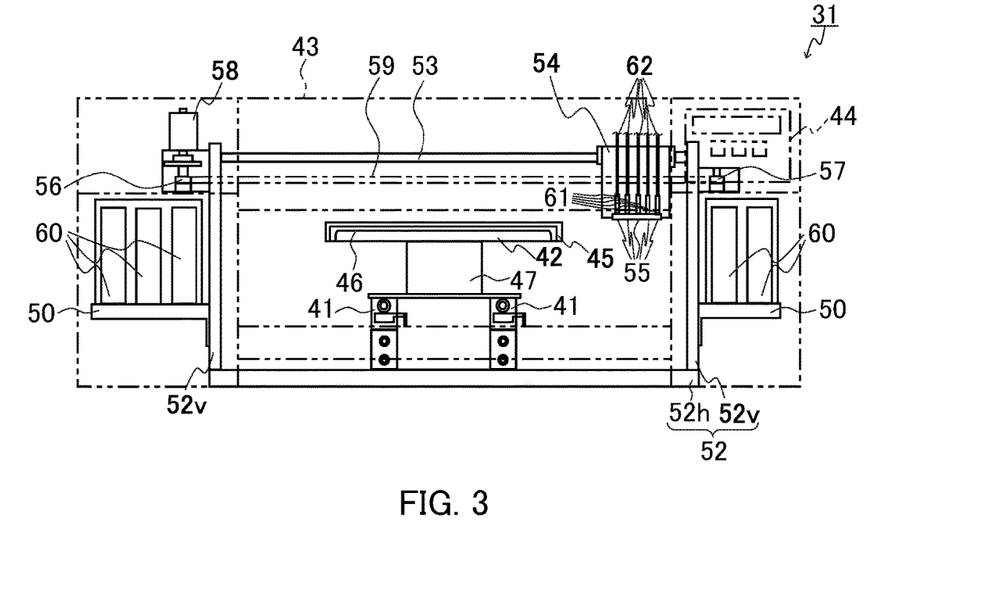
FIG. 3 is a front view showing an example configuration of an ink-jet printer of the ink-jet recording apparatus shown in FIG. 2.

The ink-jet printer 31 is provided with a frame 52 as shown in FIG. 3. The frame 52 includes a horizontal portion 52h located at the bottom of the printer 31 and two vertical portions 52v vertically rising from the both ends of the horizontal portion 52h. In FIG. 3, identical parts to those shown in FIG. 2 are indicated with identical numerals and symbols. The same applies to FIGS. 4A, 4B, and 5.

A slide rail 53 is horizontally extended so as to link the upper parts of the two vertical portions 52v. The slide rail 53 is provided with a carriage 54 which is slidable along the longitudinal direction (main scanning direction) of the slide rail 53. On the lower surface of the carriage 54, five piezoelectric ink-jet heads (ink ejecting units) 55 for ejecting five colors of ink are provided.

Pulleys 56 and 57 are supported by the upper parts of the two vertical portions 52v. The motor shaft of a motor 58 is linked to one of the pulleys (pully 56), which is supported by the vertical portion 52v. An endless belt 59 is extended between the pulleys 56 and 57, and the carriage 54 is fixed on an appropriate part of the endless belt 59.

With such a configuration, in response to the forward and reverse rotations of one of the pulleys (pulley 56) driven by the motor 58, the carriage 54 is linearly reciprocated along the longitudinal direction (main scanning direction) of the slide rail 53. As a result, the ink-jet head 55 is reciprocated.

A mounting portion 50 to which ink cartridges 60 are detachably mounted is formed on each of the two vertical portions 52v. The ink cartridges 60 of two colors can be mounted on one of the two mounting portions 50 and the ink cartridges 60 of three colors can be mounted on the other of the two mounting portions 50. Ink bags (not shown) provided in the ink cartridges 60 are connected to five ink tanks 61 located above the ink-jet heads 55 through flexible tubes 62. Since the five ink tanks 61 are in communication with the ink-jet heads 55 as described below, inks are supplied from the ink cartridges 60 to the ink-jet heads 55.

On the horizontal portion 52h of the frame 52, a slide mechanism 41 is provided as a carrying unit, and a platen (support) 42 is supported by the slide mechanism 41 from below. The platen 42 is provided with a fixing frame (fixing unit) 45 configured to position fabric such as a T-shirt with the surface including an area to be recorded up and set the T-shirt in the state where it is tautly stretched and has no wrinkles or unevenness. The ink-jet printer 31 of this example includes one platen 42. The number of the platens however is not limited to one in the present invention and can be increased as needed.

In order to reciprocate the platen 42 in the direction perpendicular to the paper surface in FIG. 3 (sliding direction of slide mechanism 41, subscanning direction of ink-jet printer 31), a platen feeding mechanism (not shown) is provided. As the platen feeding mechanism, for example, a rack-and-pinion mechanism, a mechanism using an endless belt, and the like can be applied.

Figure 4A:
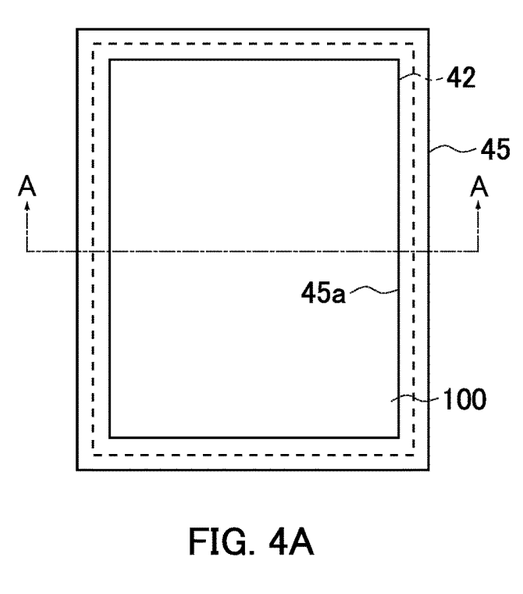
FIG. 4A is a plan view showing the state where fabric is set on a platen of the ink-jet recording apparatus shown in FIG. 2.
Figure 4B:
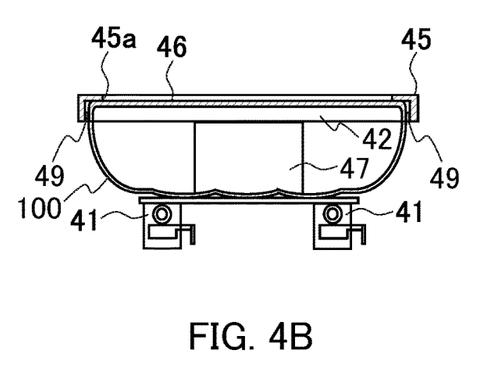
FIG. 4B is a cross-sectional view taken along line A-A of FIG. 4A.

As shown in FIGS. 4A and 4B, the platen 42 is a rectangle having the longitudinal direction in the subscanning direction in a planer view and includes a support surface 46 for supporting a T-shirt 100. The lower surface of the platen 42 at the farthest side in the direction perpendicular to the paper surface in FIG. 4B is linked to the slide mechanism 41 at the facing position through a support member 47.

The fixing frame 45 having an L-shaped cross section is configured to cover the four sides of the support surface 46 of the platen 42. An opening 45a having an opening area slightly smaller than the area of the support surface 46 of the platen 42 is formed on the surface of the fixing frame 45 facing the support surface 46 of the platen 42. In setting of the T-shirt 100 on the platen 42, the T-shirt 100 is placed on the platen 42 from the hem side in such a manner that the support surface 46 of the platen 42 is covered with the T-shirt 100 and the T-shirt 100 is fixed with the fixing frame 45. The fixing frame 45 is provided rotatably by a rotation portion (not shown) provided at the end of the platen 42, positioned at the farthest side in the direction perpendicular to the paper surface in FIG. 4B, and the T-shirt 100 is fixed between the platen 42 and the fixing frame 45 by rotating the fixing frame 45 so as to fit to the platen 42 after covering the platen 42 with the T-shirt 100.

The ink-jet printer 31 includes a cover 43. The ink-jet heads 55, the slide mechanism 41, and the like are covered with the cover 43. The cover 43 is perspectively illustrated by chain double-dashed lines in FIG. 3. An operation panel 44 provided with a liquid crystal panel and operation buttons is provided at a predetermined position of the right upper part of the front surface of the cover 43.

The five ink-jet heads 55 shown in FIG. 3 correspond to the inks of five colors (yellow, magenta, cyan, black, and white), are arranged in parallel along the reciprocating direction of the carriage 54, and are in communication with the corresponding ink cartridges 60 through the flexible tubes 62 and the ink tanks 61. For example, the white ink is the water-based white pigment ink for ink-jet recording. The other inks may be inks in general. As the configuration for supplying inks to the ink-jet heads, for example, a conventionally known configuration may be employed (for example, see JP 2004-291461 A). As to the five ink-jet heads 55, a head unit including ejection units that eject the inks of four colors (yellow, magenta, cyan, and black) and a head unit including an ejection unit that ejects a white ink may be aligned in the subscanning direction.

The ink-jet heads 55 are disposed in such a manner that a small gap is formed between the lower surfaces of the ink-jet heads 55 and the support surface 46 of the platen 42, and an area to be recorded of the T-shirt 100 set on the platen 42 is fed to the gap when an image is recorded on the T-shirt 100. With this configuration, by reciprocating the ink-jet heads 55 by the carriage 54 while ejecting the color inks from plural ejection nozzles with micro-diameters formed on the bottom surfaces of the ink-jet heads 55 to the T-shirt 100, the color inks are held on the surface of a recording medium. As a result, a desired color image is recorded on the T-shirt 100.

The recording control unit 70 shown in FIG. 2 is, for example, configured using a general-purpose personal computer (PC) and includes a main body 71, a display as a display portion 72, and a keyboard 73 and a mouse (pointing device) 74 as an operation portion 75.

Figure 5:
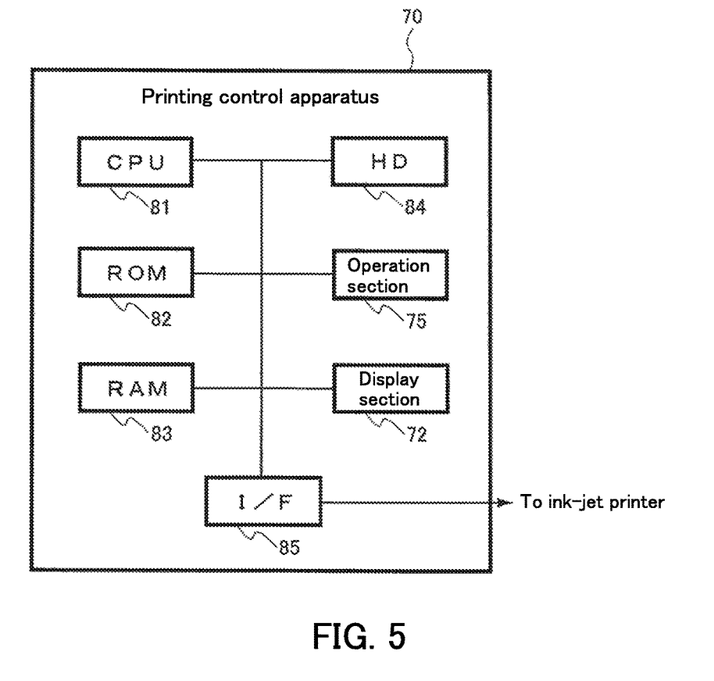
FIG. 5 is a block diagram showing the configuration of a recording control unit of the ink-jet recording apparatus shown in FIG. 2.

As shown in FIG. 5, the recording control unit 70 includes a central processing unit (CPU) 81, a read only memory (ROM) 82, a random access memory (RAM) 83, a hard disk (HD) 84, an operation portion 75, a display portion 72, and an interface (I/F) 85, and they are connected via a bus.

The HD 84 stores various programs for use in control of the operation of the recording control unit 70. The HD 84 further stores various image data downloaded via the internet or the like or created by software and various data for each kind of fabric (e.g. T-shirt). The CPU 81 performs various operations and processes based on signals input with the operation portion 75 and various programs and data stored in the ROM 82, the RAM 83, and the HD 84. Then, data and the like are sent to the ink-jet printer 31 via the interface 85. The RAM 83 is a volatile storage device which is readable and writable and stores results of the operations and the like obtained in the CPU 81. The interface 85 is connected to the interface of the ink-jet printer 31 and allows the printing control apparatus 70 and the ink-jet printer 31 to communicate with each other.

The recording of a desired image on the T-shirt 100 using the ink-jet recording apparatus 30 of the present example can be performed as follows, for example. First, the data of a desired image to be recorded on the T-shirt 100 is acquired via the keyboard 73 and the mouse 74 of the recording control unit 70. As to the acquisition of the image data, the image data is created using software installed in the recording control unit 70 or the image data preliminarily stored in the HD 84 is selected.

Next, the T-shirt 100 is fixed to the platen 42. That is, the T-shirt 100 is placed on the platen 42 from the hem side, stretched along the support surface 46 of the platen 42, and fixed with the fixing frame 45 in the state of having no wrinkles.

Subsequently, in response to the instruction of recording by a user, the image data is sent to the ink-jet printer 31 via the interface 85, inks are ejected from the ink-jet heads 55 based on this image data, and an image is recorded on the T-shirt 100 fixed on the platen 42.

The method for forming an image may include, after the image printing step, a heat-fixing step of heat-fixing the ink on the fabric by applying heat treatment to an area to be printed of the fabric. The heat-fixing step can be performed, for example, using the same apparatus and under the same condition as the heat treatment step. The heat-fixing step can be performed using the apparatus described in JP 2009-209493 A, for example. This apparatus can apply 180° C. heat and pressure to the fabric.

A recorded matter having less cracks of an ink film formed on the surface of the T-shirt 100 and a good abrasion resistance can be obtained. The water-based white pigment ink for ink-jet recording is favorably used in formation of a white base layer in color recording to deep color fabric, for example. The white base layer is required to have high whiteness and high concealing properties in many cases. In a conventionally known method, the amount of a white pigment containing a hollow particle to be added in an ink is required to be higher as mentioned above, for example, to obtain whiteness and concealing properties equivalent to the case of using a white pigment containing a non-hollow particle. Furthermore, when a binding component such as the resin is heated to form a film containing the hollow particle, cracks of the film are prone to be generated. However, according to the present invention, cracks of the film can be reduced not only in the case of using a white pigment containing the non-hollow particle but also in the case of using a white pigment containing the hollow particle, for example.

EXAMPLES

The examples are described below together with comparative examples. The present invention, however, is by no means limited thereto.

Examples 1 to 14 and Comparative Examples 1 to 10

Each white pigment, each first resin emulsion, and each second resin emulsion in the ink composition (Table 1) were stirred and mixed to obtain a mixture solution. Glycerin was then added to each mixture solution, which was then further stirred and mixed. Water was thereafter added to this mixture solution, which was then stirred and mixed. A surfactant was then added to this mixture solution, which was then stirred and mixed for 2 hours. This mixture solution was subsequently subjected to suction filtration with an industrial filter paper 64 (size of particle to be captured: 4 μm) produced by Advantec Toyo Kaisha, Ltd. and thereafter again subjected to suction filtration with industrial filter 64G (size of particle to be captured: 1.5 μm). Thus, the water-based white pigment inks for ink-jet recording of Examples 1 to 14 and Comparative Examples 1 to 10 shown in Table 1 were obtained. The amounts of the glycerin, the surfactant, and the water to be added are as shown in Table 1.

The inks of Examples 1 to 14 and Comparative Examples 1 to 10 were subjected to (a) a crack evaluation, (b) a tensile elongation evaluation, and (c) an abrasion resistance evaluation by the following methods.

(a) Crack Evaluation

The ink cartridge for ink-jet garment printer GT-381 produced by Brother Industries, Ltd. was filled with each of the inks of Examples 1 to 14 and Comparative Examples 1 to 10. The ink cartridge was mounted to the ink-jet garment printer GT-381, and solid recording was performed on black fabric which has preliminarily been treated with a treatment agent (20 wt % calcium chloride aqueous solution). Evaluations were made visually according to the following evaluation criteria.

Crack Evaluation

Evaluation Criteria:

AA: There was no crack in a recorded (ink film) part in 200% or more elongation of the fabric;

A: There was no crack in a recorded (ink film) part in 100% or more and less than 200% elongation of the fabric;

B: A recorded (ink film) part was cracked in 100% or more elongation of the fabric; and C: A recorded (ink film) part was cracked in dryness of the ink.

(b) Tensile Elongation Evaluation

The recording was performed in the same manner as in the crack evaluation and the evaluation was made according to the following evaluation criteria.

Tensile Elongation Evaluation

Evaluation Criteria:

AA: A recorded (ink film) part was elongated well (200% or more), and returned to its original form after elongation;

A: A recorded (ink film) part could be elongated (less than 200%), and returned to its original form after elongation;

B: A recorded (ink film) part could be elongated (less than 200%), but did not return to its original form after elongation; and C: A recorded (ink film) part was cracked without elongation.

(c) Abrasion Resistance Evaluation

The recording was performed in the same manner as in the crack evaluation, a recorded (ink film) part was scrubbed using a Gakushin-Type Rubbing Tester "RT-300" produced by DAIEI KAGAKU SEIKI MFG. CO., LTD, and color transfer to a white test fabric set in a probe of the rubbing tester was evaluated according to the following evaluation criteria.

Abrasion Resistance Evaluation

Evaluation Criteria:

AA: There was no color transfer (grade 4 or more according to JIS L 0489 II);

A: There was slight color transfer (grade 3 according to JIS L 0489 II);

B: There was color transfer (grade 2 according to JIS L 0489 II); and

C: There was considerable color transfer (grade 1 according to JIS L 0489 II).

Table 1 shows the composition and evaluation results of the inks of Examples 1 to 14 and Comparative Examples 1 to 10.

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 |
| Ink Composition (wt %) | White pigment | SX-868 (B) (*1) | 10 | 10 | 10 | 10 | 10 | 10 | 10 | 10 | — |
| | | ROPAQUE ® ULTRA E (*2) | — | — | — | — | — | — | — | — | 10 |
| | First Resin Emulsion (R1) | BONTIGHTER ® HUX-282 (*3) | 4 | 6 | 7 | 8 | 10 | — | — | — | — |
| | | PERMARIN ® UA-150 (*4) | — | — | — | — | — | — | — | — | 4 |

TABLE 1-continued

|  |  |  |  |  |  |  |  |  |  |  |
|---|---|---|---|---|---|---|---|---|---|---|
|  |  | PERMARIN® UA-200 (*5) | — | — | — | — | — | — | — | — | — |
|  |  | SUPERFLEX® 460 (*6) | — | — | — | — | — | 4 | 7 | 10 | — |
|  | Second Resin Emulsion (R2) | BONTIGHTER® HUX-386 (*7) | — | — | — | — | — | — | — | — | — |
|  |  | BONTIGHTER® HUX-564 (*8) | 10 | 8 | 7 | 6 | 4 | — | — | — | — |
|  |  | UCOAT® UX-320 (*9) | — | — | — | — | — | 10 | 7 | 4 | 10 |
|  | Humectant | Glycerin | 20 | 20 | 20 | 20 | 20 | 20 | 20 | 20 | 20 |
|  | Surfactant | OLFIN® E-1010 (*10) | 0.5 | 0.5 | 0.5 | 0.5 | 0.5 | 0.5 | 0.5 | 0.5 | 0.5 |
|  |  | Water | Balance | Balance | Balance | Balance | Balance | Balance | Balance | Balance | Balance |
|  | R1/R2 |  | 0.4 | 0.75 | 1 | 1.33 | 2.5 | 0.4 | 1 | 2.5 | 0.4 |
|  | Crack |  | A | AA | AA | AA | A | A | A | A | A |
|  | Elongation |  | A | AA | AA | AA | A | A | A | A | A |
|  | Abrasion Resistance |  | A | AA | AA | AA | A | A | A | A | A |

|  |  |  | Examples |  |  |  |  | Comparative Examples |  |  |
|---|---|---|---|---|---|---|---|---|---|---|
|  |  |  | 10 | 11 | 12 | 13 | 14 | 1 | 2 | 3 |
| Ink Composition (wt %) | White pigment | SX-868 (B) (*1) | — | — | — | — | — | 10 | 10 | 10 |
|  |  | ROPAQUE® ULTRA E (*2) | 10 | 10 | 10 | 10 | 10 | — | — | — |
|  | First Resin Emulsion (R1) | BONTIGHTER® HUX-282 (*3) | — | — | — | — | — | 2 | 3 | 11 |
|  |  | PERMARIN® UA-150 (*4) | 7 | 10 | — | — | — | — | — | — |
|  |  | PERMARIN® UA-200 (*5) | — | — | 4 | 7 | 10 | — | — | — |
|  |  | SUPERFLEX® 460 (*6) | — | — | — | — | — | — | — | — |
|  | Second Resin Emulsion (R2) | BONTIGHTER® HUX-386 (*7) | — | — | 10 | 7 | 4 | — | — | — |
|  |  | BONTIGHTER® HUX-564 (*8) | — | — | — | — | — | 12 | 11 | 3 |
|  |  | UCOAT® UX-320 (*9) | 7 | 4 | — | — | — | — | — | — |
|  | Humectant | Glycerin | 20 | 20 | 20 | 20 | 20 | 20 | 20 | 20 |
|  | Surfactant | OLFIN® E-1010 (*10) | 0.5 | 0.5 | 0.5 | 0.5 | 0.5 | 0.5 | 0.5 | 0.5 |
|  |  | Water | Balance | Balance | Balance | Balance | Balance | Balance | Balance | Balance |
|  | R1/R2 |  | 1 | 2.5 | 0.4 | 1 | 2.5 | 0.17 | 0.27 | 3.67 |
|  | Crack |  | A | A | A | A | A | C | C | A |
|  | Elongation |  | A | A | A | A | A | C | C | A |
|  | Abrasion Resistance |  | A | A | A | A | A | AA | AA | C |

|  |  |  | Comparative Examples |  |  |  |  |  |  |
|---|---|---|---|---|---|---|---|---|---|
|  |  |  | 4 | 5 | 6 | 7 | 8 | 9 | 10 |
| Ink Composition (wt %) | White pigment | SX-868 (B) (*1) | 10 | 10 | 10 | — | — | — | — |
|  |  | ROPAQUE® ULTRA E (*2) | — | — | — | 10 | 10 | 10 | 10 |
|  | First Resin Emulsion (R1) | BONTIGHTER® HUX-282 (*3) | 12 | — | — | — | — | — | — |
|  |  | PERMARIN® UA-150 (*4) | — | — | — | 3 | 11 | — | — |
|  |  | PERMARIN® UA-200 (*5) | — | — | — | — | — | 3 | 11 |
|  |  | SUPERFLEX® 460 (*6) | — | 3 | 11 | — | — | — | — |
|  | Second Resin Emulsion (R2) | BONTIGHTER® HUX-386 (*7) | — | — | — | — | — | 11 | 3 |
|  |  | BONTIGHTER® HUX-564 (*8) | 2 | — | — | — | — | — | — |
|  |  | UCOAT® UX-320 (*9) | — | 11 | 3 | 11 | 3 | — | — |
|  | Humectant | Glycerin | 20 | 20 | 20 | 20 | 20 | 20 | 20 |
|  | Surfactant | OLFIN® E-1010 (*10) | 0.5 | 0.5 | 0.5 | 0.5 | 0.5 | 0.5 | 0.5 |
|  |  | Water | Balance | Balance | Balance | Balance | Balance | Balance | Balance |
|  | R1/R2 |  | 6 | 0.27 | 3.67 | 0.27 | 3.67 | 0.27 | 3.67 |
|  | Crack |  | AA | C | AA | C | A | C | AA |

TABLE 1-continued

|  |  |  |  |  |  |  |  |
|---|---|---|---|---|---|---|---|
| Elongation | AA | B | AA | C | A | C | AA |
| Abrasion Resistance | C | AA | C | AA | C | AA | C |

Footnote of Table 1
(*1): Product of JSR Corporation; styrene-acrylic dispersion liquid; solid content: 20 wt %; primary particle size: 0.3 μm
(*2): Product of Rohm and Haas Electronic Materials K.K.; styrene-acrylic dispersion liquid; solid content: 30 wt %; primary particle size: 0.4 μm
(*3): Product of ADEKA CORPORATION; solid content: 55 wt %
(*4): Product of Sanyo Chemical Industries, Ltd.; solid content: 30 wt %
(*5): Product of Sanyo Chemical Industries, Ltd.; solid content: 50 wt %
(*6): Product of DKS Co., Ltd.; solid content: 38 wt %
(*7): Product of ADEKA CORPORATION; solid content: 30 wt %
(*8): Product of ADEKA CORPORATION; solid content: 40 wt %
(*9): Product of Sanyo Chemical Industries, Ltd.; solid content: 30 wt %
(*10): Product of Nissin Chemical Industry Co., Ltd.

The amounts of the white pigment, the first resin emulsion, and the second resin emulsion to be added are expressed in solid content.

As summarized in Table 1, Examples 1 to 14 showed good results in the crack evaluation, the tensile elongation evaluation, and the abrasion resistance evaluation. In particular, Examples 2 to 4 satisfying R1/R2=0.75 to 1.33 and having the tensile elongation of the first resin emulsion from 1000% to 1200% showed excellent results in the crack evaluation, the tensile elongation evaluation, and the abrasion resistance evaluation. In Examples 1 to 14, the hollow particle was used as the white pigment. Also in the case where the non-hollow particle was used as the white pigment, the good results were obtained in the crack evaluation, the tensile elongation evaluation, and the abrasion resistance evaluation. Comparative Examples 1, 2, 5, 7, and 9 satisfying R1/R2<0.4 showed bad results in the crack evaluation and the tensile elongation evaluation. Comparative Examples 3, 4, 6, 8, and 10 satisfying R1/R2>2.5 showed bad results in the abrasion resistance evaluation.

It will be obvious to those having skill in the art that many changes may be made in the above-described details of the particular aspects described herein without departing from the spirit or scope of the invention as defined in the appended claims.

What is claimed is:

1. A water-based white pigment ink for ink-jet recording, comprising:
    a white pigment; and
    water, wherein
    the water-based white pigment ink further comprises:
    a first resin emulsion having a tensile elongation from 600% to 1200% as a film, measured in accordance with JIS K 7127; and
    a second resin emulsion having a maximum tensile stress from 50 MPa to 80 MPa as a film, measured in accordance with JIS K 7127, and
    a solid content (R1) of the first resin emulsion to be added and a solid content (R2) of the second resin emulsion to be added in the total amount of the ink satisfy R1/R2=0.4 to 2.5.

2. The water-based white pigment ink for ink-jet recording according to claim 1, satisfying R1/R2=1:0.75 to 1.33.

3. The water-based white pigment ink for ink-jet recording according to claim 1, wherein the first resin emulsion has a tensile elongation from 1000% to 1200% as a film, measured in accordance with JIS K 7127.

4. The water-based white pigment ink for ink-jet recording according to claim 1, wherein
    the second resin emulsion has a tensile elongation from 600% to 1200% as a film, measured in accordance with JIS K 7127.

5. The water-based white pigment ink for ink-jet recording according to claim 1, wherein
    the first resin emulsion has a maximum tensile stress from 50 M Pa to 80 MPa as a film, measured in accordance with JIS K 7127.

6. The water-based white pigment ink for ink-jet recording according to claim 1, wherein
    the white pigment is a hollow particle.

7. The water-based white pigment ink for ink-jet recording according to claim 1, for use in formation of an image on fabric.

8. The water-based white pigment ink for ink-jet recording according to claim 1, wherein
    a solid content (P) of the white pigment and the sum of the solid content (R1) and the solid content (R2) (R1+R2) in the total amount of the ink satisfy (R1+R2)/P=0.8 to 3.

9. The water-based white pigment ink for ink-jet recording according to claim 8, satisfying (R1+R2)/P=1 to 2.

10. The water-based white pigment ink for ink-jet recording according to claim 1, wherein the first resin emulsion is at least one selected from the group consisting of an urethane resin emulsion, an acryl resin emulsion, and a styrene resin emulsion.

11. The water-based white pigment ink for ink-jet recording according to claim 1, wherein the second resin emulsion is at least one selected from the group consisting of an urethane resin emulsion, an acryl resin emulsion, and a styrene resin emulsion.

* * * * *